United States Patent
Parker

[11] 3,906,352
[45] Sept. 16, 1975

[54] METHOD OF MAKING A THREE-DIMENSIONAL SEISMIC PROFILE OF OCEAN FLOOR

[75] Inventor: William H. Parker, Hurst, Tex.

[73] Assignee: Del Norte Technology, Inc., Euless, Tex.

[22] Filed: Mar. 16, 1973

[21] Appl. No.: 342,206

[52] U.S. Cl.... 340/7 R; 340/15.5 TS; 340/15.5 MC
[51] Int. Cl.² ........................ G01V 1/20; G01V 1/38
[58] Field of Search ...... 340/15.5 TS, 7 R, 15.5 CP, 340/15.5 MC

[56] References Cited
UNITED STATES PATENTS

| | | | |
|---|---|---|---|
| 3,414,874 | 12/1968 | McLoad | 340/7 R |
| 3,506,955 | 4/1970 | Backus et al. | 340/15.5 CP |
| 3,731,270 | 5/1973 | Penhollow | 340/15.5 CP |
| 3,746,122 | 7/1973 | Davis | 340/15.5 MC |
| 3,806,863 | 4/1974 | Tilley | 340/7 R |

*Primary Examiner*—Richard A. Farley
*Assistant Examiner*—H. A. Birmiel

[57] ABSTRACT

Two survey vessels sail on side-by-side parallel courses. Each vessel tows a streamer-like seismic sound detector array having an attached floating tail buoy, equipped with a microwave transponder. The two vessels are in intimate radio contact with each other, to assist in and coordinate the seismic mapping operations. Alternately, each vessel "shoots" to transmit seismic energy toward the ocean floor. Both vessels record all seismic "shots". Important timing of the reflected sound waves are recorded. Telemetered information is exchanged between the two vessels via VHF in order to tie the two records together. A computer extrapolates and interprets the recorded sound waves to provide three or more profiles of the sub-bottom strata below the ocean floor. The spirit of this invention is to provide at least one beam-stearing array suitable for mapping geologic horizons well below the sea floor. The frequencies 10-40 Hz are desirable to penetrate any substantial distance into the earth's crust.

11 Claims, 6 Drawing Figures

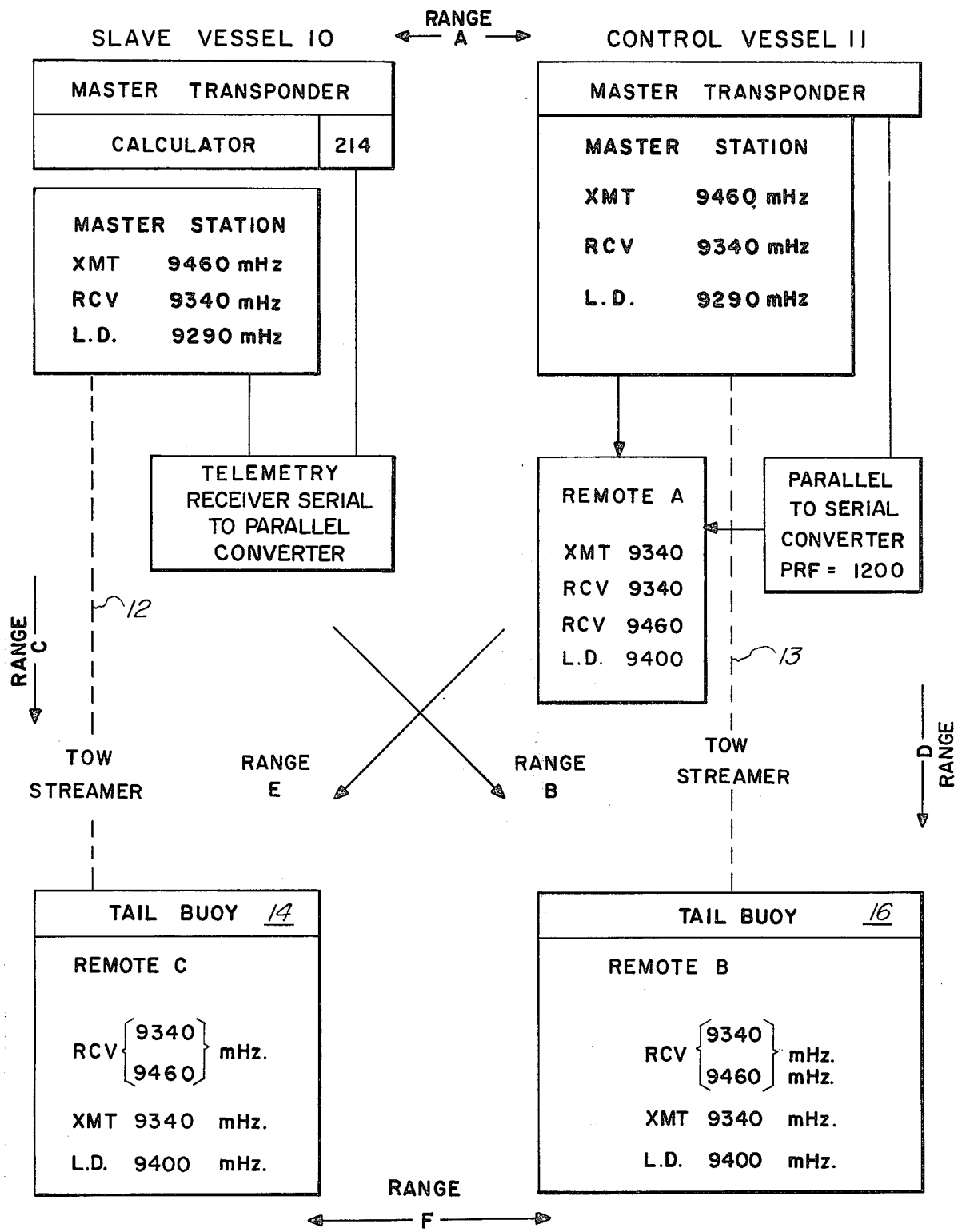

METHOD OF MAKING A THREE-DIMENSIONAL SEISMIC PROFILE OF OCEAN FLOOR

This invention relates to methods of surveying, and more particularly to methods of making a three-dimensional survey of the ocean floor.

Seismic exploration systems are, of course, well known, both on land and at sea. The usual method of mapping subterranean structure involves a recording of the echoes of a series of seismic shots. These shots may be generated in any suitable manner as by dropping explosive charges or by pulsing an underwater transducer. The sound waves are transmitted from a moving vessel or boat which detects echoes, reflected from the ocean floor. These methods are only efficient in coverage of a vertical plane. Thus, the usual method produces a section representing the acoustic or seismic interpretation of shape. By computation, the system may print out an indication of the profile of the seismic section in the vertical plane.

A better profile map can be made if a recorded section is made simultaneously along a first line of traverse and another line lying across the first line. If two sections are made at right angles to each other, the additional data improves the probability that a correct interpretation of the seismograms will be made. However, this use of two lines of traverse raises a number of problems of coordination and of precise control over the course and position of the vessel.

Accordingly, an object of the invention is to provide new and improved methods for making a three-dimensional profile of geological horizons at the bottom of a body of water. Here, an object is to provide means for acquiring seismic data along two precise and parallel lines of traverse. More particularly, an object is to closely coordinate the location of two seismic data acquisition vessels or boats following predetermined courses.

Another object of the invention is to enable vessels or boats to acquire seismic data which can be interpreted by computers receiving the data. In general, an object is to provide means for data acquisition by means of two vessels or boats following two parallel courses.

In keeping with an aspect of the invention, two survey vessels provide parallel coverage on either side of a given line as well as along the "normal" plane of traverse. These two survey vessels sail along side-by-side, parallel courses. Each vessel repeatedly generates seismic sound and tows a multi-section seismic streamer detector array having a floating tail buoy to the distant end. The two vessels are in intimate radio contact with each other, to assist in and coordinate their course of traverse. Each vessel alternately shoots a pulse of sonic energy, and both vessels record all seismic shots from either vessel. The important timing of the recorded events (e.g., echoes of the shots) is telemetered between the vessels via a VHF channel in order to tie the two records together. Two of these events are the start of a tape recording or the beginning of a record cycle. Short-term timing can be provided locally on each vessel. A computer interprets the resulting data to produce a model of the ocean floor.

Preferred embodiments of the invention, for accomplishing these and other objects, may be understood best from a study of the following specification and the attached drawings wherein:

FIG. 1 schematically shows a method wherein two seismic vessels travel over parallel, side-by-side courses and detect seismic data;

Figure 5:
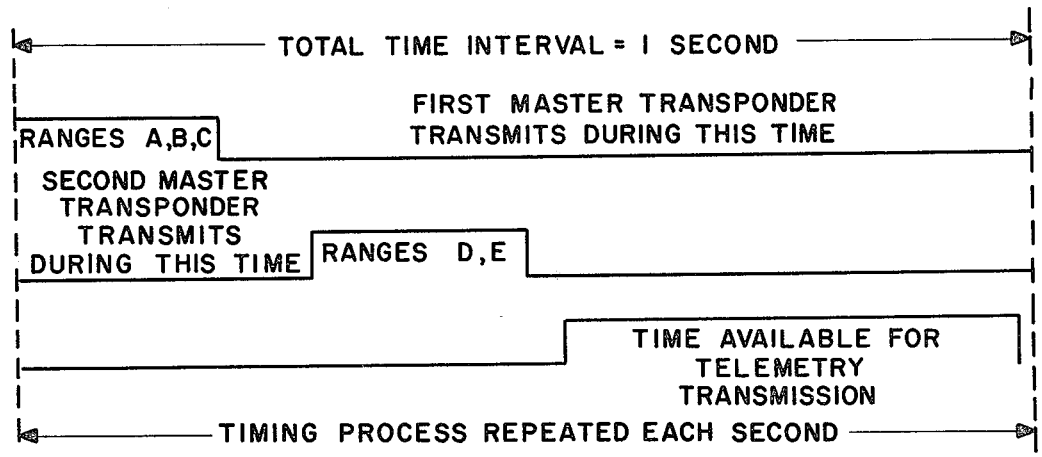

FIG. 4 schematically discloses the planes in which the two vessels generate a profile by means of sonic energy;

FIG. 5 is a timing diagram of the system operation; and

FIG. 6 is a diagram giving the system frequencies of an exemplary system.

During the course of the follwing specification, it will be convenient to refer to a particular trilateral transponder position detector system. The term "trilateral" implies that the position of a point (e.g., a vessel position) is determined by finding the lengths of each of three distances forming a triangle with the located point being a master transponder at one angle of the triangle and a remote transponder at each of the other two angles. The distance measurement is determined as a function of the speed at which signals are propagated between the transponders. One example of such a trilateral system is found in a co-pending U.S. patent application Ser. No. 195,687, filed Nov. 4, 1971, by James W. Merrick, entitled, "RADAR TRILATERALIZATION POSITION LOCATORS", and assigned to the assignee of this application.

Figure 1:
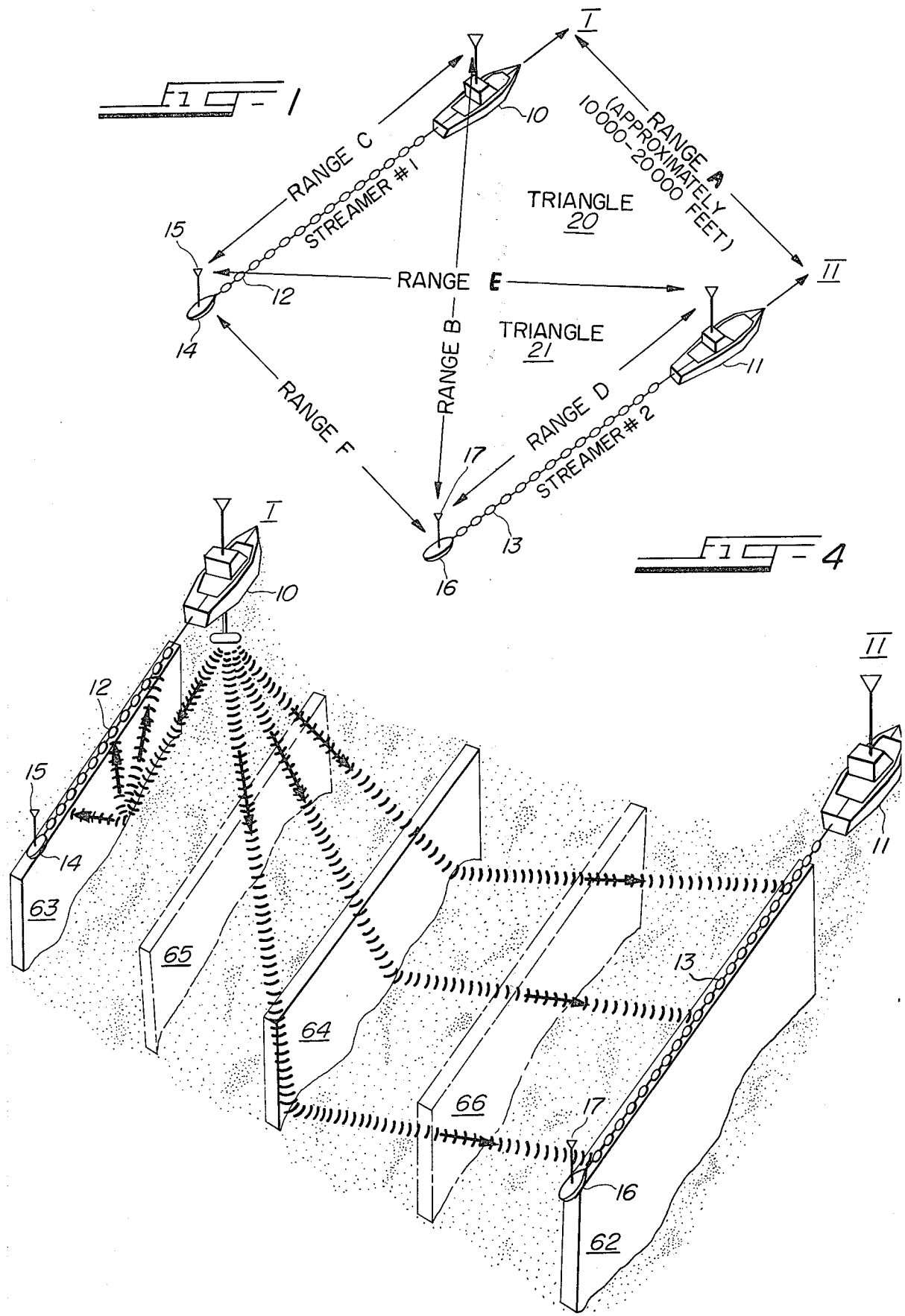

FIG. 1 discloses the basic nature of a two-vessel system for the acquisition of three-dimensional seismic data. In greater detail, FIG. 1 shows two vessels 10, 11 moving along parallel side-by-side courses I and II. As it moves over its course, each vessel periodically generates pulses of sonic energy in the water under it. These pulses may be produced in any convenient manner as by dropping explosive charges, by pulsing an underwater transducer, or by towing a sound generating probe. The term shots is used herein to describe these pulses of sonic energy regardless of their source.

Each of the vessels tows an individually associated sonic energy detection streamer 12, 13, respectively. Again, the nature of equipment used to practice the inventive method is not too important. In one embodiment, the streamer may be a cable having a plurality of underwater detector transducers attached thereto. Each transducer may be connected to the vessel by a separate wire in the cable. Or a common wire may be used in conjunction with a multichannel transmission system.

In any event, the important timing is not the nature of the equipment used. Rather, the important feature is that the streamer is able to detect and accurately report the reception of echoes of the shots reflected from structures at the ocean floor, and particularly from underlying rock or sediment discontinuities which reflect some of the incident energy impinging on each interface at such a discontinuity.

Tail buoy 14 is connected to streamer 12 and has a microwave transponder 15 mounted thereon. Likewise, tail buoy 16 is connected to streamer 13, and it also carries a microwave transponder 17. These transponders provide means for locating a tail buoy if it should break loose. This is especially important in times of inclement weather, poor visibility, or at night.

The two vessels 10, 11 are in constant radio communication with each other, preferably on VHF channels. However, the vessels may also transmit telemetry information over the channel used for ranging and detection signaling. When this is done, there is time sharing of the radio transmission equipment. Preferably, the ranging and detection signals are sent out for a half second. Then, the telemetry equipment transmits for the next half second. This way, the radio equipment may be reduced.

Figure 2:
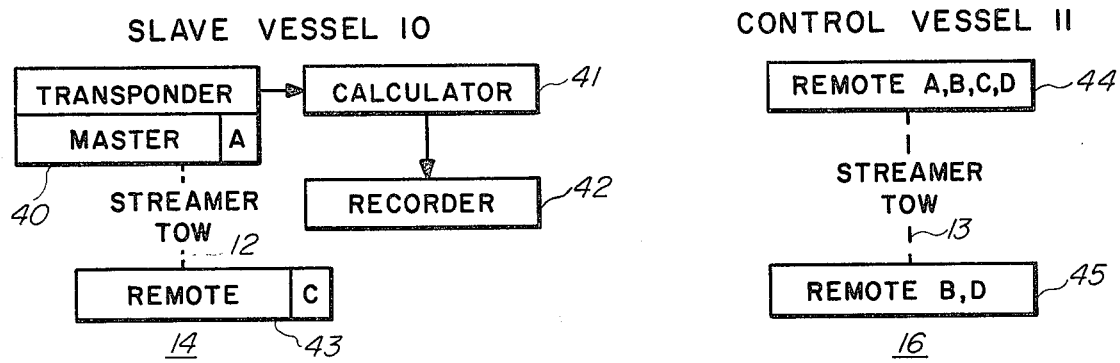
FIG. 2 is a block diagram showing the location of control equipment used to practice a first embodiment of the inventive method.
Figure 3:
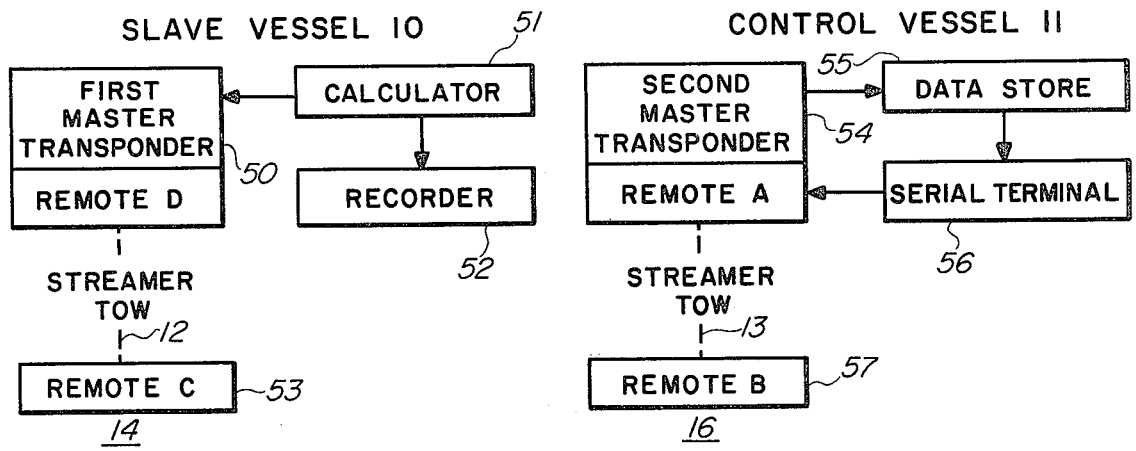
FIG. 3 is a block diagram showing the location of control equipment used to practice a second embodiment of the inventive method.

The vessels carry trilateral ranging equipment of the type described in the above-identified patent application. Vessel 11 acts as a master vessel and vessel 10 acts as a slave vessel. The equipment locations for practicing the two preferred methods of this invention are shown in FIG. 2 and 3. The slave vessel 10 carries a master transponder 40, a computer or other calculation device 41, and a data recorder 42. A remote transponder 43 is carried by the tail buoy 14 on the end of the streamer 12. A second remote transponder 44 is on the control vessel 11, and a third remote transponder 45 is carried by the tail buoy 16, at the end of the streamer 13. The letters A-D are shown in FIG. 2 to identify the transponders which communicate with each other.

To practice the second method (FIG. 3), the salve vessel 10 carries both a master and a remote transponder 50 with a computer or calculator 51 and a data recorder 52 coupled thereto. The vessel 10 tows a remote transponder unit 53 on the tail buoy 14, at the end of the streamer 12. The control vessel carries a similar master and remote transponder 54. These transponders 54 are connected to a temporary data store circuit 55. The data is read out of the data store 55 and fed into a serial terminal 56 for transmission as telemetry over a time shared channel during one-half of each time period period. The other half of each second is used to obtain the data. Control vessel 11 tows a tail buoy 16 which carries the remote transponder unit 57. When the modified transponder 54 is not under command of its own master control, it acts as a remote unit responsive to the other master unit 50. A further system modification provides for sending range data telemetry during the times when neither master unit requires a use of the radio-frequency link. The timing for transmission of such telemetry data occupies the "off" time, automatically build into the system timing.

The trilateral radar unit is used to measure the distances separating the vessels, the tail buoys, and each vessel from its tail buoy, which distances are shown in FIG. 1 as ranges A-F. These distances must be known if the recorded data are to be processed intelligently.

Each of the vessels 10, 11 makes a recording of the reflected echoes of its locally produced shot of sonic energy. Alternatively, it also makes a record of the sound waves of the shot produced by the other vessel. Wavefront arrivals of the sonic energy at streamer 13 (for example) will be traveling at an oblique angle with respect to streamer 13, when a seismic shot is produced by the "slave" vessel 11. Similarly, the wavefronts caused by vessel 11, and received by the streamer 12 attached to vessel 10, will also be traveling at an oblique angle.

The horizontal distances, or geometry of the recording pattern, must also be known to enable an accurate calculation of time-distance relationships. These calculations are normally made in a semi-automated computer facility, possibly on ship board. In general, the velocity determination in sediment is not within the scope of these calculations. The data from the field operation is preferably looked at by seismologists. The above reference to computer calculations is primarily to provide a real-time "fixing" of the vessel position. The calculations of the time-depth relationships in the seismic data is usually sent to geophysical processing centers using powerful scientific computers.

The optimum velocities are determined by a trial and error method involving an application of interval velocity measurements to various segments of the path through which the seismic signal travels. Computer aided operations and methods give a more exact reduction of the available data to analyze the seismic "picture" of an area under examination.

According to the invention, more exact data is obtained because the seismic energy recordings are made through four separate paths:

1. A seismic section is taken along range D parallel to the line of traverse of the "control" boat 11;
2. A seismic section is taken along range C parallel to the line of traverse of the slave boat 10;
3. A seismic section is taken from the control boat 11 looking toward the slave boat 10; and
4. A seismic section is taken from the slave boat 10 looking toward the control boat 11.

There are two methods of ascertaining the lengths of the various ranges shown in FIG. 1. According to a first method, a pair of transponders on the two vessels and one on the tail buoy 14 may transmit transponder signals between themselves, as taught in the above-identified co-pending application. From these transponder signals, the ranges A and E may be read directly. The angle between the two ranges are also known. Therefore, the various other ranges may be calculated by simple trigonometry. According to a second method, both of the vessels 10, 11 and the buoys 14, 16 may carry transponders and the ranges may be read directly. The range measurements may be transmitted between the vessels for calibration purposes.

When the second method is used, the two vessels transmit on a time shared basis. Range A is measured only during system calibration. Thereafter, range data D and E are transmitted from the control vessel 11 to the slave vessel 10. The dual system is equipped with auxiliary data storage. Telemetry adaption means may transmit the digital information about ranges D, E, and A to the slave vessel 10 over the same transponder link that is used as a distance measuring link. If different pulse repeat frequencies are used for these two functions, a preferred system sends a telemetry at a rate of 1200 or 2400 bits per second. These bit rates are preferred because they are compatible with presently available telephone-grade data terminals. Also, since it takes less than ½ of a second to make the required range measurements, about ½ of each second remains available for data transmission.

Preferably, the transponder located on the slave vessel is arranged to include a serial output coupled to the transponder receiver to transmit the telemetry data to a computer on shipboard.

After the lengths of various sides are found, the control vessel uses range A to give left and right directional signals to slave vessel 10. Range B may be used to give speed up or slow down signals to the slave vessel, thereby adjusting the relative fore and aft positions of the two vessels. In this manner, the exact position and course of the two vessels may be maintained constant with respect to each other. The slave vessel 10 is simply instructed to maintain an offset distance which is read out each second and displayed by the equipment on shipboard, as taught by the above-identified application.

The profile of a reflection surface on or under the ocean floor between the two vessels can be crosschecked by providing redundancy of data responsive to both way propagation os seismic signals from each vessel. Seismic data is recorded from this common reflection point through a repetition of multiple shots transmitted through multiple paths, in repetitive reflections. These reflections are computed by suitable data processing equipment, to extrapolate the locations of the bottom profile which lies in a common plane half way between and parallel to the paths which the vessels traverse. Other planes of common data intercepts are also generated by the computer reduction of data. When these planes are viewed side-by-side they produce a more complete picture of the true shape of the underlying geological strata in the area of survey (FIG. 4).

FIG. 4 depicts the way two of the planes of data read directly by the two vessels are related to each other. Several additional computer sections are also shown as having been derived from the directly read data. The number of sections which may be so produced is primarily limited by the economics of the process. In order to produce this data, the actual marine filed operation does not necessarily require the distances to be controlled exactly, if the distances are recorded for use by the computer center which reduces the data.

In greater detail, the control vessel 11 sails along course II, and the slave vessel 10 sails along a parallel course I at a fixed distance (range A) apart. As the vessel 11 sails, it generates seismic shots which are picked up by streamer 13 to gather data in the vertical plane 62 traversed by the streamer. Likewise, streamer 12 on the slave vessel 10 picks up data in the vertical plane 63 traversed by the streamer 12, responsive to shots from vessel 10.

The data in vertical plane 64 is computed responsive to data picked up on vessel 11 responsive to shots from vessel 10 and also responsive to shots picked up on vessel 10 responsive to shots from vessel 11. Supplementary planes 65, 66 are generated mathematically by a computer extrapolating the data recorded by the streamers.

The control vessel 11 endeavors to navigate down the imaginary line II previously laid out for the survey. The slave vessel follows. This does not mean that both vessels cannot be separately equipped with dual navigation means which are completely separate from the transponder control system described here. In fact, some very direct advantages can be foreseen in dual control operations by transposition, where other radio location systems are used in the primary survey to improve the validity, by diversity reception. The various radio receivers are located apart a known distance. This transposition, or diversity reception is also known as a "Musa" system (after the Greek mythology). It has long been practiced on land stations and is the backbone of modern tropospheric scatter methods of communication. The redundancy of reception points has not heretofore been possible without exact knowledge of the distance separating vessels.

As the two vessels travel along their respective parallel courses I and II, the control over the slave vessel 10 is maintained responsive to calculation, with the law of sines, and the shape of the triangle No. 2. The Commander of the slave vessel will attempt to hold his position relative to the position of the control vessel. Range D is used as a baseline for making a survey of the line of traverse. This survey is continuously made throughout the course of the seismic tour.

Some drift of the two tail buoys is expected. However, the drift of streamer 13 is expected to be equivalent to the drift of the streamer 12. Thus, the ideal rectangular arrangement of vessels and buoys will not normally be realized. Nevertheless, a knowledge of the placement of the several transponder stations, relative to each other, "ties" the survey internally with sufficient range accuracy to enable computer reduction of seismic data.

The seismic frequencies of 10 to 40 Hertz are suggested in FIG. 6, for the second method described above. Attendant long wavelengths in the bottom sediment allow sizable variations in geometry, thereby permitting an adequate "seismic stack" of data. In any event, the lozenge can be computed, and data paths can be adjusted from knowledge of the total array geometry.

A third vessel could also by employed, but the shooting and recording cycle would not allow as much local coverage as is currently considered necessary. That is, current practice is to produce two seismic shots for each detector space. This produces an overlap factor of 50% in line coverage. Utilization of a third vessel would also encumber the total system reliability. The central vertical section 64 between the two normal sections 63, 66, as shown in FIG. 4 includes the line of traverse and seismic coverage of the third vessel.

The inventive system reduces the need for vessels sailing along cross-lines, as is the prior practice. These co-called cross-lines were previously shot to provide data on cross dip. Now the cross-lines are usually eliminated, since the supplementary sections shown in FIG. 4 can be produced from the data recorded on a single traverse by two vessels. The cross-line section is constructed by a computer from the several intersections of the primary, secondary, and supplementary section planes 62–66. In effect, an imaginary cross-line section can be constructed with the computer, as desired. This is within the scope of beam-steering a multitude of detector arrivals and stacking several seismic shots for each data point in the three-dimensional model producible from data recorded by the inventive method.

Those who are skilled in the art will readily perceive other modifications. Therefore, the appended claims are to be construed to cover all equivalent structures which fall within the true scope and spirit of the invention.

I claim:

1. A method of making a three-dimensional profile of the bottom of a body of water, said method comprising the steps of:
   a. simultaneously moving two vessels in precisely controlled relationship along two parallel lines of traverse, each vessel towing an individually associated streamer in the form of a line hydrophone,
   b. repeatedly generating cyclically recurring pulses of seismic sound waves on each of said vessels, c. picking up the reflections of said sound pulses at each of said streamers,
d. interpreting the seismic caused variations in the picked up reflections according to which of said vessels is providing the source of pulses causing said reflections,
e. towing a buoy at the free end of each of said streamers, and
f. interchanging navigational signal measurements via radio channels extending between transponders on said vessels and said buoys in order to maintain said precisely controlled relationship between said two vessels.

2. The method of claim 1 and the added step of:
sequentially transmitting navigational and seismic information over said radio channels on a time shared basis.

3. The method of claim 1 and the added step of:
computing a profile of the structure on or under the ocean floor along a midcourse between said parallel lines of traverse responsive to echoes picked up at each of said streamers when the vessel towing the other of said streamers generates one of said pulses.

4. The method of claim 1 and the added step of:
extrapolating by computation the bottom structure along supplemental courses parallel to said lines of traverse responsive to data derived from echoes picked up by said streamers.

5. The method of claim 1 and the added step of:
carrying a transponder means on each of said towed buoys whereby each vessel may know the position of said buoy despite drift of the tow line or when the tow line breaks.

6. The method of claim 1 and the added step of:
recording the data transmitted over said radio channels.

7. The method of claim 4 wherein each of said radio channels lies in the VHF range.

8. The method of claim 1 and the added step of:
locally generating clock signals for short-term timing of seismic events at said vessel.

9. A two-vessel method of acquisition of three-dimensional seismic data comprising the steps of sailing said two vessels while each is towing line hydrophone streamers over parallel paths, said line hydrophone comprising an interconnected series of individual hydrophones thereby forming a single cable, means whereby each of said hydrophones may individually report each seismic experience which it encounters, sequentially transmitting navigational and seismic data over common radio channels extending between transponders at opposite ends of each of said line hydrophone streamers, sounding recurring seismic shots from each of said vessels in timed sequence, picking up at each of said streamers reflected energy caused by said timed shots, and computing a structure of seismic horizons in at least the two vertical parallel planes traversed by said streamers and a third vertical plane midway between and parallel to said two vertical parallel planes.

10. The method of claim 9 and the added steps wherein one of said two vessels acts as a master for selecting and controlling the path of traverse and the other of said two vessels acts as a slave by always remaining in a position which is precisely and constantly related to the position of said master vessel.

11. The method of claim 10 and the added step of temporarily recording all data as it is received.

* * * * *